(12) United States Patent
Yoshida et al.

(10) Patent No.: US 8,400,370 B2
(45) Date of Patent: Mar. 19, 2013

(54) MULTIPLE IMAGE DISPLAY DEVICE AND IMAGE DISPLAY DEVICE

(75) Inventors: Tomonori Yoshida, Osaka (JP); Jiaqiang Sun, Shenzhen (CN); Chunping Liao, Shenzhen (CN)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 628 days.

(21) Appl. No.: 12/537,325

(22) Filed: Aug. 7, 2009

(65) Prior Publication Data

US 2010/0033402 A1 Feb. 11, 2010

(30) Foreign Application Priority Data

Aug. 8, 2008 (JP) ................................ 2008-205848

(51) Int. Cl.
*G09G 5/00* (2006.01)
(52) U.S. Cl. ......................................... 345/1.3; 348/838
(58) Field of Classification Search ..................... 345/1.3
See application file for complete search history.

(56) References Cited

U.S. PATENT DOCUMENTS 7,777,811 B2 * 8/2010 Kondo ........................... 348/383
2007/0104392 A1 5/2007 Huang

FOREIGN PATENT DOCUMENTS

| EP | 1 326 436 A2 | 7/2003 |
|---|---|---|
| EP | 1 326 436 A3 | 1/2005 |
| JP | 8-126018 | 5/1996 |
| JP | 2000321597 | 11/2000 |
| JP | 2003169271 | 6/2003 |
| JP | 2006-319509 A | 11/2006 |

OTHER PUBLICATIONS

Office Action issued Jul. 26, 2012 in a corresponding European application No. 09 010 177.5.
English Abstract for JP 2006-319509 A, published Nov. 24, 2006.

\* cited by examiner

*Primary Examiner* — Alexander Eisen
*Assistant Examiner* — Robin Mishler
(74) *Attorney, Agent, or Firm* — NDQ&M Watchstone LLP

(57) ABSTRACT

In a multiple image display device that is provided with a plurality of image display devices and that displays a single input image, the image display devices each divide the input image into division images that are individually displayed on the image display devices, and enlarge and display them. In particular, the image display device provided in an edge portion of the multiple image display device enlarges the division image toward a side opposite from the side of the edge portion. In this way, the edge portion of the input image is displayed on the multiple image display.

1 Claim, 9 Drawing Sheets

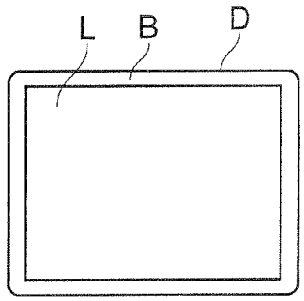
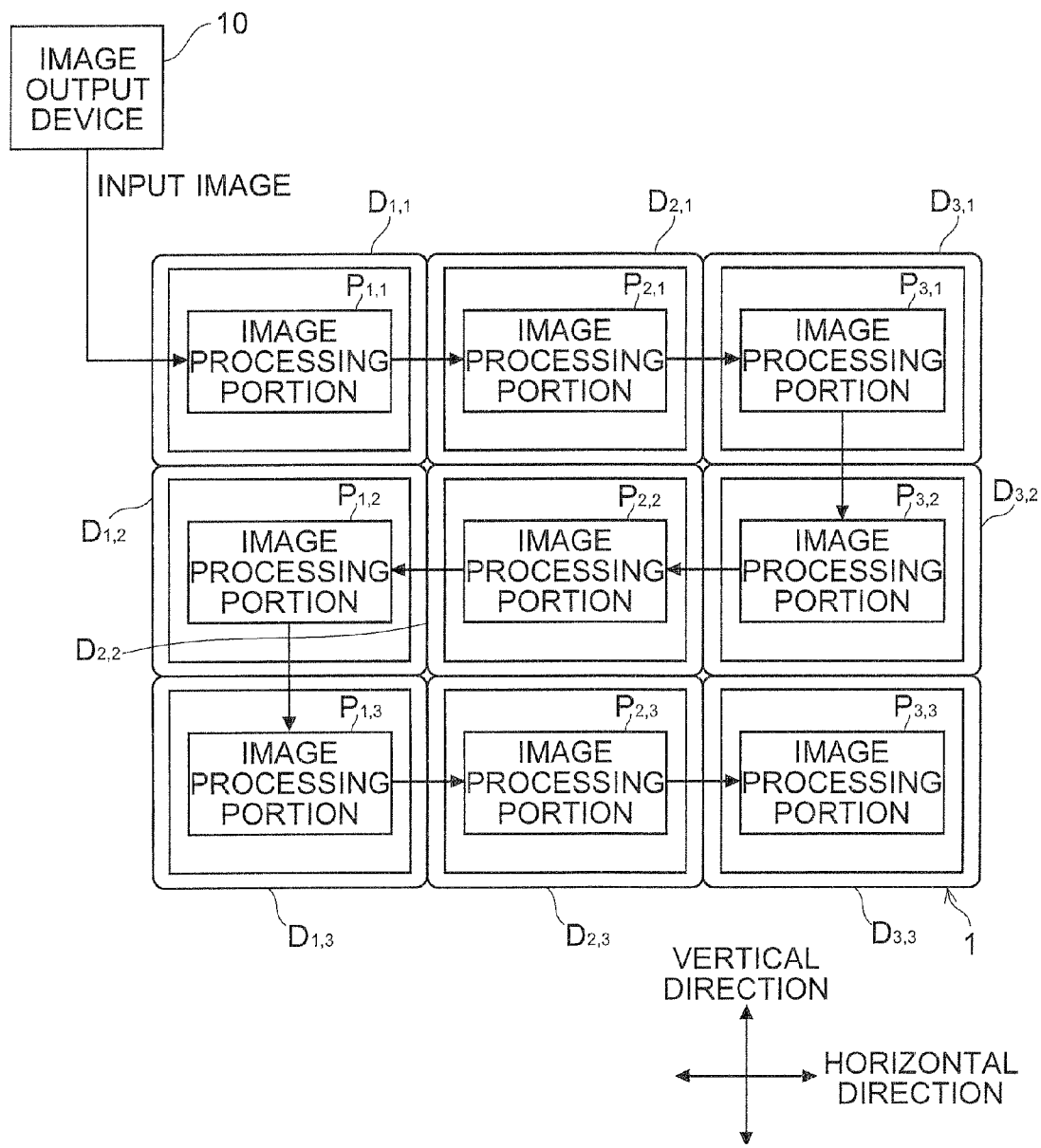

FIG.11
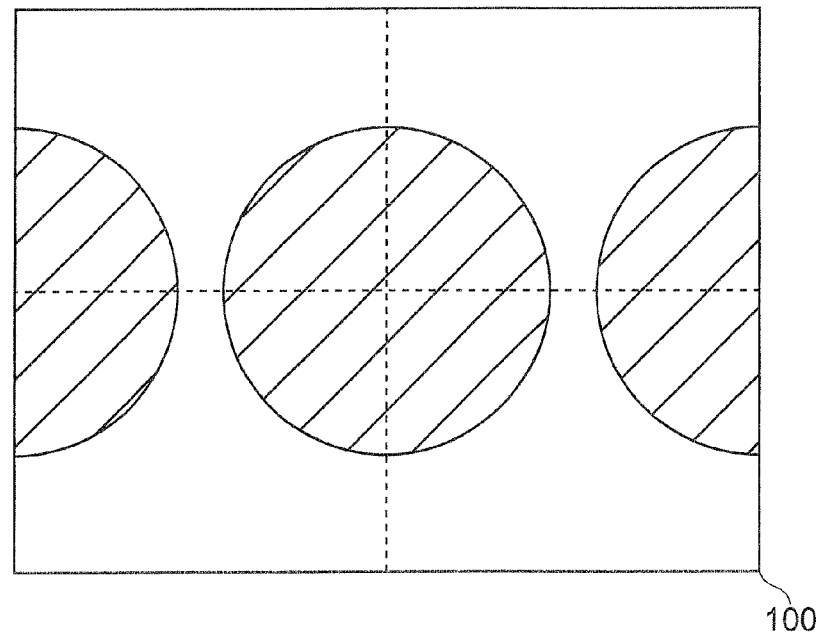
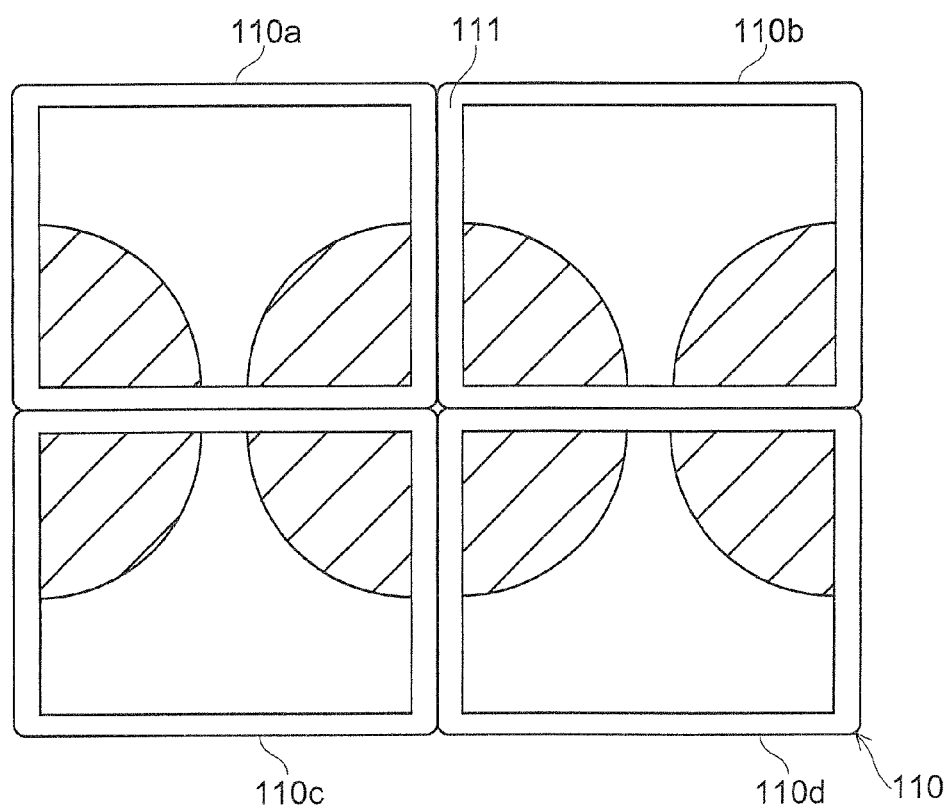

FIG.12
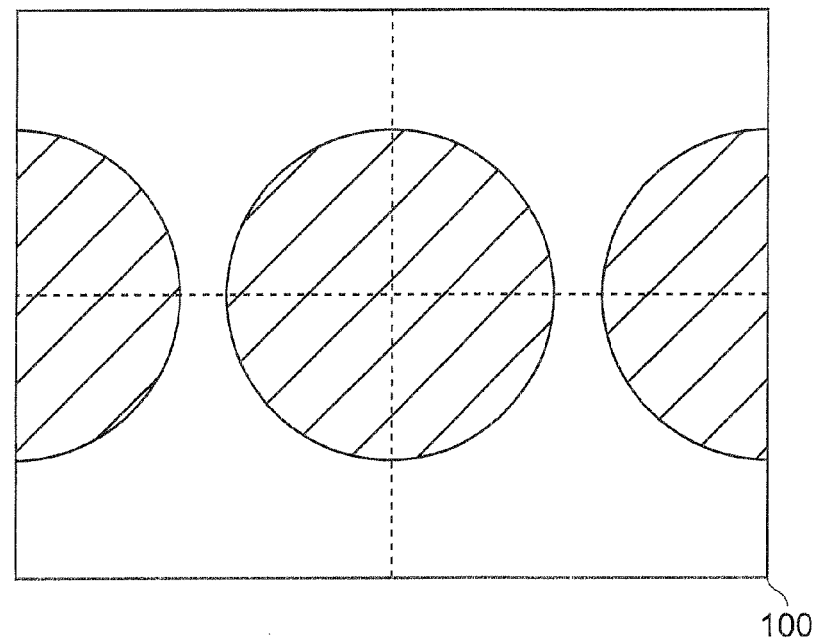
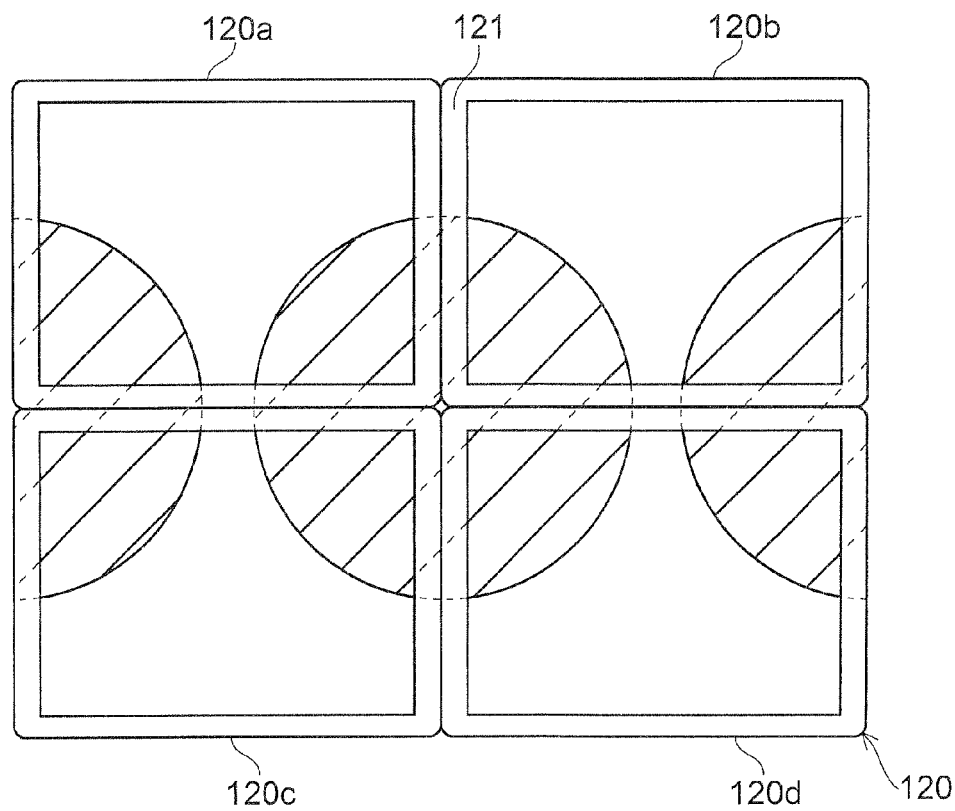

MULTIPLE IMAGE DISPLAY DEVICE AND IMAGE DISPLAY DEVICE

This nonprovisional application claims priority under 35 U.S.C. §119(a) on Patent Application No. 2008-205848 filed in Japan on Aug. 8, 2008, the entire contents of which are hereby incorporated by reference.

BACKGROUND OF THE INVENTION

1. Field of the Invention

The present invention relates to a multiple image display device that has a plurality of image display devices and that displays a single image and to image display devices that constitute a multiple image display device.

2. Description of the Related Art

In recent years, the screens of image display devices have become increasingly larger. In particular, not only is the screen of an image display device increased in size, but also there is provided an image display device in which a plurality of image display devices are combined together to offer a larger screen (hereinafter referred to as a multiple image display device).

The image display devices that constitute such a multiple image display device are each provided with a display portion (for example, a liquid crystal panel) and a housing portion (hereinafter, a bezel portion) that is placed around the display portion and that produces no display. Since the bezel portion is present, the screen of the multiple image display device is divided into a plurality of portions, with the result that the screen becomes noncontinuous.

One of the problems resulting from the noncontinuous screen will be described with reference to FIG. 11. FIG. 11 is a schematic diagram showing an example of a conventional multiple image display device. FIG. 11 shows a case where a single input image 100 is divided into four portions and where the portions of the divided image are displayed, as they are, by the multiple image display device 110 incorporating four image display devices 110a to 110d. The multiple image display device 110 is configured by combining the image display devices 110a to 110d together, two in a horizontal direction and two in a vertical direction. "Displaying them as they are" means that, when two portions of the image that are displayed with the bezel portion 111 interposed therebetween are disposed side by side, they become continuous.

As shown in FIG. 11, when the four portions of the divided image are displayed, as they are, on the image display devices 110a to 110d, the image is distorted. For example, as shown in FIG. 11, when a perfect circle is displayed without being displayed on the bezel portion 111, the circle is divided by the bezel portion 111, and the width of the bezel portion 111 is inserted. This causes the perfect circle, as a whole, to be formed in the approximate shape of an ellipse, with the result that the displayed image becomes distorted.

On the other hand, an example of a multiple image display device that prevents a displayed image from becoming distorted is shown in FIG. 12. FIG. 12 is a schematic diagram showing an example of a conventional multiple image display device. As in FIG. 11, FIG. 12 shows a case where the four portions obtained by dividing the input image 100 are displayed on four image display devices 120a to 120d. In the multiple image display device 120, a bezel portion 121 is considered to be a region where display can be achieved, and the image is displayed accordingly. In particular, the divided image is enlarged and parts of it are also assigned on even the bezel portion 121. Since the parts of the image assigned on the bezel portion 121 are not actually displayed, they are represented by broken lines in FIG. 12. As shown in FIG. 12, the use of the multiple image display device 120 reduces the image distortion shown in FIG. 11.

However, in the multiple image display device 120 shown in FIG. 12, the parts of the image are also assigned on the bezel portion 121 in the perimeter thereof (in the example shown in FIG. 12, the left and right edge portions thereof). Specifically, the edge portions of the input image 100 and the bezel portion 121 overlap each other, and thus the edge portions are not displayed. Unlike the middle portion of the input image 100, the edge portions of the input image 100 are relatively difficult to estimate from the adjacent portions of the image. Thus, when the edge portions of the input image 100 are not displayed on the screen, the image is significantly difficult to recognize.

Moreover, in a case where the multiple image display device 120 is used as a display of, for example, a personal computer, when a GUI (graphical user interface) such as a mouse pointer is placed on an edge portion of the input image 100 and is not displayed, the operability is significantly degraded. In particular, as compared with the case where the GUI is hidden on the bezel portion in the middle portion, the GUI hidden on the bezel portion in the edge portion is more unlikely to be found by a user, with the result that it is difficult to recognize.

SUMMARY OF THE INVENTION

According to one aspect of the present invention, there is provided a multiple image display device for displaying one input image on a plurality of display devices adjacent to each other with a boundary portion therebetween, the multiple image display device including: a division portion dividing the input image into division images that are displayed on each of the display devices; and an enlargement portion enlarging the division images obtained in the division portion, in which the enlargement portion enlarges the division images according to positions of the display devices in the multiple image display device.

According to another aspect of the present invention, there is provided a display device, consisting a portion of a multiple image display device made by plurality of arranged image displays, including: a division portion acquiring a division image of the input image that is displayed by the display device; and an enlargement portion enlarging the division image obtained in the division portion; in which the enlargement portion enlarges the division image according to a position of the display device in the multiple image display device.

BRIEF DESCRIPTION OF THE DRAWINGS

FIG. 1 is a block diagram showing an example of the configuration of an image display device;

FIG. 2 is a block diagram showing an example of the configuration of a multiple image display device according to an embodiment of the present invention;

FIG. 11 is a schematic diagram showing an example of a conventional multiple image display device; and FIG. 12 is a schematic diagram showing an example of a conventional multiple image display device.

DETAILED DESCRIPTION OF PREFERRED EMBODIMENTS

Figure 3:
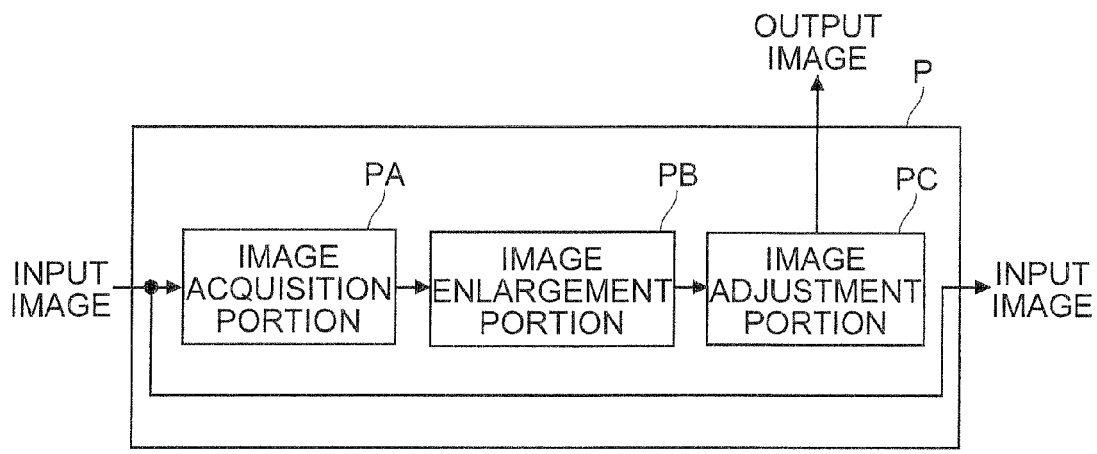
FIG. 3 is a block diagram showing an example of the basic configuration of an image processing portion.

An embodiment of an image display device and a multiple image display device will be described below with reference to the accompanying drawings. Examples of the configuration and operation of the multiple image display device will first be described.

<<Multiple Image Display Device>>

An example of the configuration of the image display device incorporated in the multiple image display device will first be described with reference to FIG. 1. FIG. 1 is a schematic diagram showing the example of the configuration of the image display device. As shown in FIG. 1, the image display device D is provided with a display portion L on which an image is displayed and a bezel portion B that is placed around the display portion L and that produces no image. The display portion L is formed with, for example, a liquid crystal panel. The bezel portion B is formed with, for example, a housing.

In FIG. 2, the example of the configuration of the multiple image display device 1 is shown. FIG. 2 is a block diagram showing the example of the configuration of the multiple image display device according to the embodiment of the present invention.

As shown in FIG. 2, the multiple image display device 1 has a plurality of image display devices D. FIG. 2 shows a case where a total of nine image display devices D is disposed, three in a horizontal direction and three in a vertical direction. Here, the horizontal direction is considered to be a lateral direction in the figure, and the vertical direction is considered to be an upward and downward direction in the figure. In order for the position of the image display device D to be identified, the image display device D is represented by the symbol $D_{i,j}$ (where "i" and "j" represent a natural number). The horizontal position number "i" represents a position in the horizontal direction; the vertical position number "j" represents a position in the vertical direction. In FIG. 2, it is assumed that the horizontal position number "i" increases as the position shifts from left to right, and that the vertical position number "j" increases as the position shifts from top to bottom. The symbol of the image display device placed in the upper left corner of the multiple image display device 1 is defined as $D_{1,1}$.

The image display devices $D_{1,1}$ to $D_{3,3}$ are provided with image processing portions $P_{1,1}$ to $P_{3,3}$, respectively. The image processing portions $P_{1,1}$ to $P_{3,3}$ are represented in the same manner as the image display devices $D_{1,1}$ to $D_{3,3}$. Specifically, the image processing portion is represented by the symbol $P_{i,j}$. The horizontal position number "i" and the vertical position number "j" of a given image display device $D_{i,j}$ are the same as those of the image processing portion $P_{i,j}$ incorporated in such an image display device $D_{i,j}$.

The signals of an input image are input from an image output device 10 to the multiple image display device 1. In FIG. 2, a configuration is shown by way of example in which the input image input to the image display device $D_{1,1}$ is passed to $D_{2,1}$ to $D_{3,1}$ to $D_{3,2}$ to $D_{2,2}$ to $D_{1,2}$ to $D_{1,3}$ to $D_{2,3}$ and to $D_{3,3}$ in this order, with the result that linearly input to all the image display devices $D_{1,1}$ to $D_{3,3}$. For example, the image display devices $D_{1,1}$ to $D_{3,3}$ are individually connected to the image output device 10, and thus the image output device 10 may input the input image to the image display devices $D_{1,1}$ to $D_{3,3}$ in a parallel manner. The configuration of the image display devices $D_{1,1}$ to $D_{3,3}$ is not limited as long as they each can acquire an image that needs to be displayed. It is preferable that, as described above, the input image be linearly input to the image display devices $D_{1,1}$ to $D_{3,3}$ because the wiring or the like of the image output device 10 and the image display devices $D_{1,1}$ to $D_{3,3}$ is simplified.

The signals of the input image include a synchronization signal, and thus the image display devices $D_{1,1}$ to $D_{3,3}$ are synchronized with each other to produce a display. Here, the image processing portions $P_{1,1}$ to $P_{3,3}$ incorporated in the image display devices $D_{1,1}$ to $D_{3,3}$ generate an image (output image) to be displayed based on a predetermined display setting. In particular, part of the input image to be displayed is obtained from the input image and is subjected to predetermined processing, with the result that the output image is generated. The configuration of the image processing portions $P_{1,1}$ to $P_{3,3}$ will be described in detail later.

The number of image display devices D incorporated in the multiple image display device 1 is not limited. In particular, there may be provided a total of "m×n" image display devices D, "m" image display devices in a horizontal direction and "n" image display devices in a vertical direction ("m" and "n" represent a natural number and satisfy formulas "i≦m" and "j≦n"). Preferably, as shown in FIG. 2, a plurality of image display devices D incorporated in the multiple image display device 1 are all the same type (in particular, the shape, size, configuration and the like of the display portion, the bezel portion and other portions are the same).

As the image display device D, for example, a display device such as a liquid crystal display device may be employed. Moreover, as the image output device 10, for example, a reception device that receives television broadcast, a reproduction device that outputs images recorded in a record medium, a personal computer or the like may be employed.

<<Image Processing Portion>>
<Basic Configuration>

The image processing portion according to the embodiment of the invention will now be described with reference to the accompanying drawings. An example of the basic configuration thereof will first be described with reference to FIG. 3. FIG. 3 is a block diagram showing the example of the basic configuration of the image processing portion. The image processing portion P shown in FIG. 3 is used in the multiple image display device 1 shown in FIG. 2.

As shown in FIG. 3, the image processing portion P is provided with: an image acquisition portion PA that acquires, from the input image, part of the input image to be displayed (hereinafter, referred to a division image); an image enlargement portion PB that enlarges the division image acquired in the image acquisition portion PA to generate an enlarged image; and an image adjustment portion PC that obtains an output image from the enlarged image received from the image enlargement portion PB.

As described previously, the image processing portion P transmits the input image to the subsequent adjacent image display device D. The image acquisition portion PA acquires, from the input image, the division image that is displayed on the image display device D. For ease of discussion, in the following description, the image display devices D incorporated in the multiple image display device 1 are considered to be all the same type. The division image refers to an image that is obtained by equally dividing the input image by the total number ("m×n"; "3×3=9" in FIG. 2) of image display devices D incorporated in the multiple image display device 1.

Figure 4A:
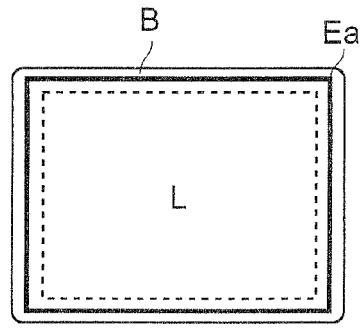
FIG. 4A is a schematic diagram showing an outline of enlargement processing performed by an image enlargement portion.
Figure 4B:
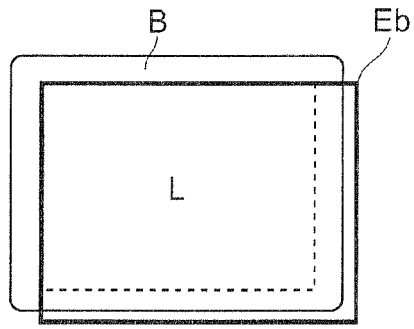
FIG. 4B is a schematic diagram showing the outline of the enlargement processing performed by the image enlarging portion.

The image enlargement portion PB enlarges the division image acquired by the image acquisition portion PA to generate the enlarged image. Here, the image enlargement portion PB enlarges the image with the bezel portion B considered to be a region where display can be achieved, and thereby generates the enlarged image. This enlargement processing performed by the image enlargement portion PB will be described with reference to FIGS. 4A and 4B. FIGS. 4A and 4B are schematic diagrams showing an outline of the enlargement processing performed by the image enlargement portion. FIGS. 4A and 4B show the display portion L of the image display device and enlarged images Ea and Eb. In FIGS. 4A and 4B, the display portion L is represented by broken lines and the enlarged images Ea and Eb are represented by heavy solid lines.

As shown in FIGS. 4A and 4B, the image enlargement portion PB enlarges the division image to obtain the enlarged images Ea and Eb. The enlarged images Ea and Eb are larger than at least the display portion L. Parts of the enlarged images Ea and Eb protrude from the display portion L to extend within the bezel portion B. FIG. 4A shows an example of the enlarged image Ea that is generated by enlarging the division image in four directions (upward, downward, leftward and rightward) of the display portion L. FIG. 4B shows an example of the enlarged image Eb that is so enlarged as to protrude downward and rightward.

As described above, the directions in which the image is enlarged (the directions in which the image is protruded) are represented relative to the position of the display portion L. The method of generating the enlarged image by the image enlargement portion PB will be described in detail in Examples of the image processing portion P, which will be described later.

The enlarged image obtained by the image enlargement portion PB is adjusted by the image adjustment portion PC, with the result that the output image is generated. The image adjustment portion PC acquires, from the enlarged image, only the part of the enlarged image that is displayed on the display portion L, and thereby generates the output image. For example, in FIG. 4A, the part of the enlarged image Ea where the enlarged image Ea and the display portion L overlap each other is the output image.

The image enlargement portion PB may perform, for example, interpolation processing. The interpolation processing refers to processing that uses pixel values for the adjacent parts of a part to be determined to determine pixel values for the part. For example, this processing is performed when an additional pixel is inserted into an area between pixels expanded by the enlargement of the image.

The image processing portion P may be provided with a buffer or the like that temporarily stores the signals of the input image.

Examples of the image processing portion will be described below. In particular, the enlargement processing performed in the image enlargement portion PB will be described. Since the operations of the image acquisition portion PA, the image adjustment portion PC and the like are identical in the Examples and are the same as in the example of the basic configuration described previously, their detailed description will be omitted.

FIRST EXAMPLE

Figure 5:
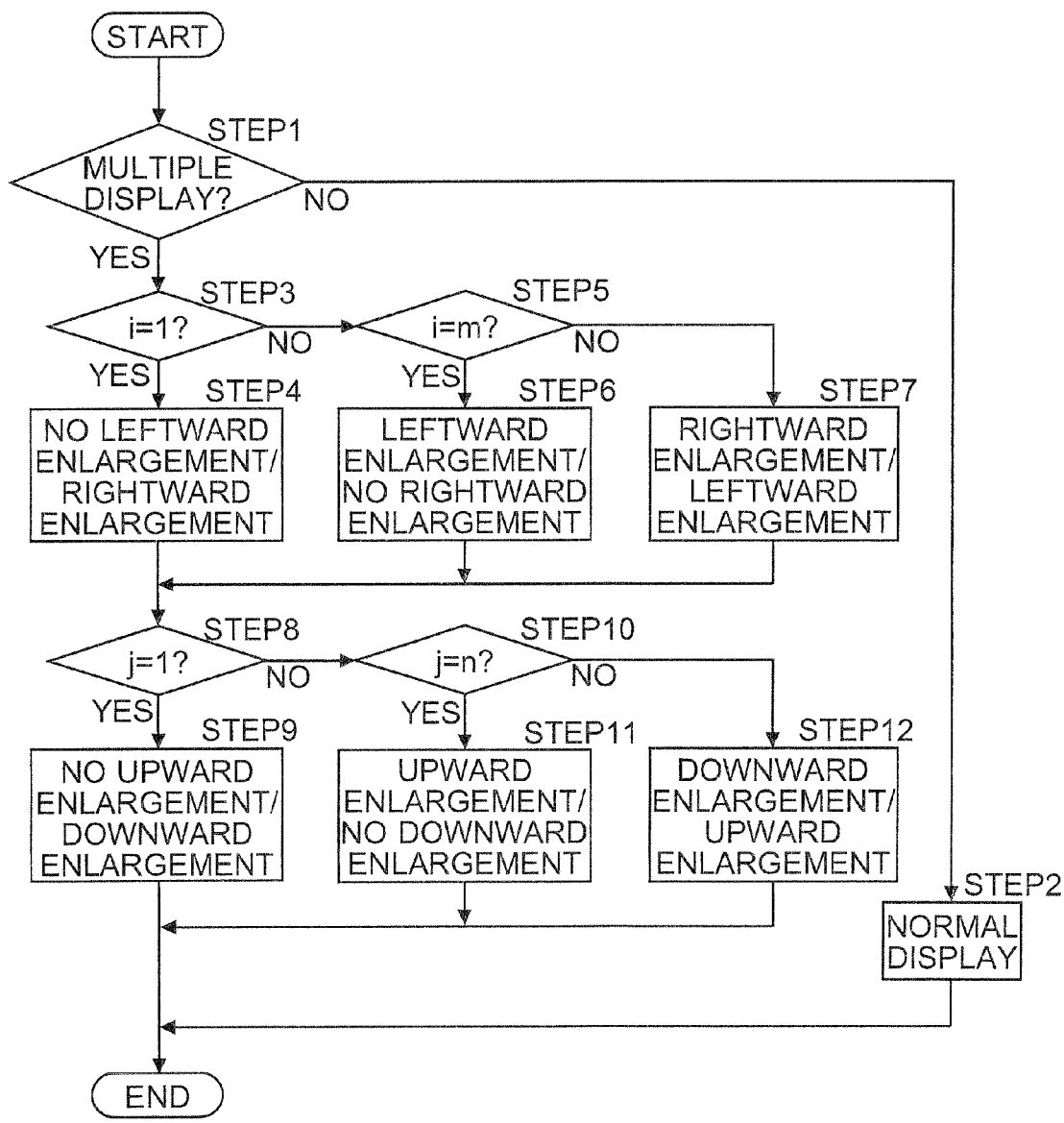
FIG. 5 is a flowchart for determining a processing method performed in the image processing portion of a first Example.
Figures 6, 7:
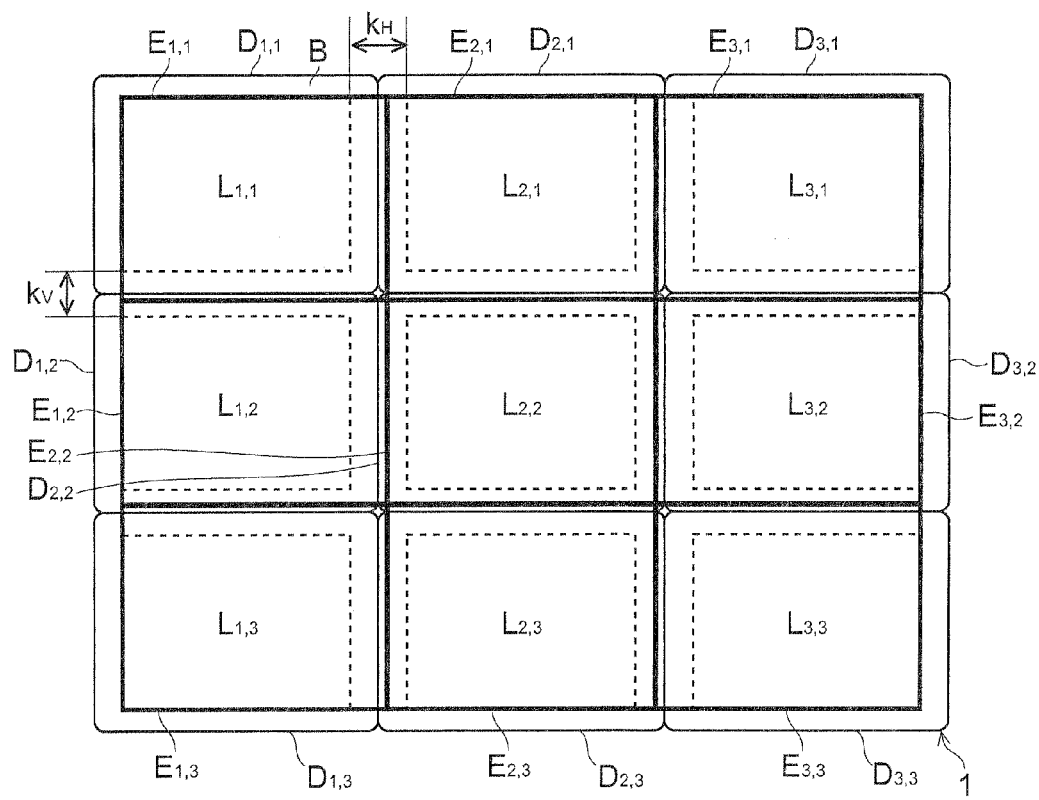
FIG. 6 is an example of a setting screen found by a user when the user adjusts the processing method performed in the image processing portion.
FIG. 7 is a schematic diagram showing enlarged images displayed on the multiple image display device.

The first Example will be described with reference to the accompanying drawings. FIG. 5 is a flowchart for determining a processing method performed in the image processing portion of the first Example. FIG. 6 is an example of a setting screen found by a user when the user adjusts the processing method performed in the image processing portion. The flowchart shown in FIG. 5 relates to processing performed in the image processing portions P, and the processing methods performed in the image processing portions P can be set on an individual basis. The setting screen shown in FIG. 6 may be displayed on, for example, the display portion L of the image display device D.

As shown in FIG. 5, the image processing portion P first checks whether or not it is set to perform a multiple display (step 1). For example, if, in the example shown in FIG. 6, a multiple display mode is set on, the multiple display mode is performed. Here, if the image processing portion P is set not to perform the multiple display (step 1, no), a normal display is determined to be performed and this process is completed (step 2).

The normal display, for example, refers to display that is performed by only one of the image display devices D or display that is performed independently by each of a plurality of image display devices D. Even when display is performed by one of the image display devices D, the generation of the division image by the image acquisition portion PA, the generation of the enlarged image by the image enlargement portion PB and the generation of the output image by the image adjustment portion PC may be performed. Specifically, in the example shown in FIG. 6, when values for horizontal bezel adjustment and vertical bezel adjustment showing the degree of enlargement (an enlargement factor) are larger than zero, the enlargement may be performed. Moreover, in this case, the image may be enlarged in the four directions.

On the other hand, if the image processing portion P is set to perform the multiple display (step 1, yes), the enlargement method performed by the image enlargement portion PB is determined. In the example shown in FIG. 5, the horizontal enlargement method is first set.

When the horizontal enlargement method is determined, whether or not the horizontal position number "i" of the image display device D is one is first checked (step 3). If the horizontal position number "i" is one, (step 3, yes), the corresponding image display device $D_{1,j}$ is an image display device that is disposed on the left edge of the multiple image display device 1 (see FIG. 2). In this case, the image enlargement portion PB fixes the left edge of the division image to the left edge of the display portion L, and the division image is enlarged rightward (step 4). The enlargement factor in this case is determined by, for example, the value for the horizontal bezel adjustment shown in FIG. 6.

If the horizontal position number "i" is not one, (step 3, no), whether or not the horizontal position number "i" is the number "m" of image display devices provided in a horizontal direction is now checked (step 5). If the horizontal position number "i" is "m" (step 5, yes), the corresponding image display device $D_{m,j}$ is an image display device that is disposed on the right edge of the multiple image display device 1 (see FIG. 2). In this case, the image enlargement portion PB fixes the right edge of the division image to the right edge of the display portion L, and the division image is enlarged leftward (step 6). The enlargement factor in this case is determined by, for example, the value for the horizontal bezel adjustment shown in FIG. 6.

If the horizontal position number "i" is not "m" (step 5, no), in the lateral direction of the corresponding image display device $D_{i,j}$, there are other image display devices $D_{i-1,j}$ and $D_{i+1,j}$ (see FIG. 2). In this case, the image enlargement portion PB enlarges the division image in both directions, that is, leftward and rightward of the display portion L (step 7). The enlargement factor in this case is determined by, for example, the value for the horizontal bezel adjustment shown in FIG. 6.

After the horizontal enlargement method is determined, the vertical enlargement method is then determined. When the vertical enlargement method is determined, whether or not the vertical position number "j" of the image display device D is one is first checked (step 8). If the vertical position number "j" is one, (step 8, yes), the corresponding image display device $D_{i,1}$ is an image display device that is disposed on the upper edge of the multiple image display device 1 (see FIG. 2). In this case, the image enlargement portion PB fixes the upper edge of the division image to the upper edge of the display portion L, and the division image is enlarged downward (step 9). The enlargement factor in this case is determined by, for example, the value for the vertical bezel adjustment shown in FIG. 6.

If the vertical position number "j" is not one, (step 8, no), whether or not the vertical position number "j" is the number "n" of image display devices provided in a vertical direction is now checked (step 10). If the vertical position number "j" is "n" (step 10, yes), the corresponding image display device $D_{i,n}$ is an image display device that is disposed on the lower edge of the multiple image display device 1 (see FIG. 2). In this case, the image enlargement portion PB fixes the lower edge of the division image to the lower edge of the display portion L, and the division image is enlarged upward (step 11). The enlargement factor in this case is determined by, for example, the value for the vertical bezel adjustment shown in FIG. 6.

If the vertical position number "j" is not "n" (step 10, no), in the upward and downward direction of the corresponding image display device $D_{i,j}$, there are other image display devices $D_{i,j-1}$, and $D_{i,j+1}$ (see FIG. 2). In this case, the image enlargement portion PB enlarges the division image in both directions, that is, downward and upward of the display portion L (step 12). The enlargement factor in this case is determined by, for example, the value for the vertical bezel adjustment shown in FIG. 6. The processing method performed by the image processing portion P is determined in this way, and the process is completed.

In the process described above and shown in FIG. 5, when the horizontal position number "i" is checked, for example, a value for the horizontal position shown in FIG. 6 can be used. When the vertical position number "j" is checked, for example, a value for the vertical position shown in FIG. 6 can be used. When the number "m" of image display devices provided in the horizontal direction is checked, for example, a value for the number of horizontal sets shown in FIG. 6 can be used. When the number "n" of image display devices provided in the vertical direction is checked, for example, a value for the number of vertical sets shown in FIG. 6 can be used.

An example of the enlarged image obtained by performing the method set as described above is shown in FIG. 7. FIG. 7 is a schematic diagram in which enlarged images are displayed on a multiple image display device. The multiple image display device shown in FIG. 7 has the same configuration as that shown in FIG. 2. Specifically, FIG. 7 shows the multiple image display device composed of a total of nine image display devices, three in a horizontal direction and three in a vertical direction.

In FIG. 7, as in FIGS. 4A and 4B, the display portions L of the image display devices D are represented by broken lines and the enlarged images E are represented by heavy solid lines. As in the image display device $D_{i,j}$, the display portion L is represented by the attachment of the same horizontal position number "i" and vertical position number "j" as the image display device $D_{i,j}$ to the display portion L. The horizontal position number "i" and vertical position number "j" of a given image display device $D_{i,j}$ are considered to be the same as those of the display portion $L_{i,j}$ incorporated in such an image display device $D_{i,j}$. The enlarged images $E_{i,j}$ are similarly represented.

As shown in FIG. 7, in the image display devices $D_{1,1}$ to $D_{1,3}$ provided on the left edge of the multiple image display device 1, the left sides of the display portions $L_{1,1}$ to $L_{1,3}$ coincide with the left sides of the enlarged images $E_{1,1}$ to $E_{1,3}$. The right sides of the enlarged images $E_{1,1}$ to $E_{1,3}$ protrude from the right sides of the display portions $L_{1,1}$ to $L_{1,3}$. In the image display devices $D_{3,1}$ to $D_{3,3}$ provided on the right edge of the multiple image display device 1, the right sides of the display portions $L_{3,1}$ to $L_{3,3}$ coincide with the right sides of the enlarged images $E_{3,1}$ to $E_{3,3}$. The left sides of the enlarged images $E_{3,1}$ to $E_{3,3}$ protrude from the left sides of the display portions $L_{3,1}$ to $L_{3,3}$.

The same is true in the vertical direction. In the image display devices $D_{1,1}$ to $D_{3,1}$ provided on the upper edge of the multiple image display device 1, the upper sides of the display portions $L_{1,1}$ to $L_{3,1}$ coincide with the upper sides of the enlarged images $E_{1,1}$ to $E_{3,1}$. The lower sides of the enlarged images $E_{1,1}$ to $E_{3,1}$ protrude from the lower sides of the display portions $L_{1,1}$ to $L_{3,1}$. In the image display devices $D_{1,3}$ to $D_{3,3}$ provided on the lower edge portion of the multiple image display device 1, the lower sides of the display portions $L_{1,3}$ to $L_{3,3}$ coincide with the lower sides of the enlarged images $E_{1,3}$ to $E_{3,3}$. The upper sides of the enlarged images $E_{1,3}$ to $E_{3,3}$ protrude from the upper sides of the display portions $L_{1,3}$ to $L_{3,3}$.

The enlarged image $E_{2,2}$ obtained in the image display device $D_{2,2}$, which is not positioned in any edge portion in the four corners of the multiple image display device 1, protrudes from the four sides of the display portion $L_{2,2}$.

When the multiple image display device 1 is configured as described above, in the edge portions of the multiple image display device 1, the sides of the enlarged images E are moved close to the sides of the display portions L. Thus, when an output image based on the enlarged images is displayed, it is easier to display the edge portions of the image. This makes it possible to display an easily recognizable image. Furthermore, it is easier for the user to find a GUI, with the result that the operability can be prevented from being degraded.

Enlargement factors "w" for all the enlarged images E may be equal to each other. When the enlargement factors "w" are equal to each other, individual images are prevented from being enlarged by a different factor. Thus, it is possible to prevent a displayed image from being distorted.

It is preferable to employ an enlargement factor "w" that will be described below because this makes it possible to further prevent the distortion. An enlargement factor $W_H$ in the horizontal direction will be primarily described below.

The enlargement factor $w_H$={(the sum of the lengths of the display portions $L$ in the horizontal direction)+(the sum of the distances between the display portions L adjacent to each other in the horizontal direction)}/(the length of a displayed image in the horizontal direction when an input image is displayed on a single display)    (1)

Here, "(the sum of the lengths of the display portions L in the horizontal direction)" in equation (1) means the sum of the lengths of the display portions (for example, the display portions $L_{1,1}$ to $L_{3,1}$) in the horizontal direction that are aligned in the horizontal direction. "(The sum of the distances between the display portions L adjacent to each other in the horizontal direction)" indicates the sum of the lengths of the bezel portions B in the horizontal direction that are interposed between the display portions L adjacent to each other in the horizontal direction (for example, the sum of the distance between the display portions $L_{1,1}$ and $L_{2,1}$ and the distance between the display portions $L_{2,1}$ and $L_{3,1}$). When the enlargement factor $w_H$ in equation (1) is used, as shown in FIG. 7, the sides of the enlarged images that protrude from adjacent display portions L in the horizontal direction coincide with each other. For example, assuming that there are neighboring displays A and B, where the display A is on the left side and the display B is on the right side. When $W_H$ is defined as equation (1), the right side of the image displayed on the display A contact with the left side of the image displayed on the display B.

For example, the right side of the enlarged image $E_{1,1}$ coincides with the left side of the enlarged image $E_{2,1}$. Here, let the distance in the horizontal direction between adjacent display portions L be $k_H$. Then, the enlarged image $E_{1,1}$ is enlarged such that it protrudes from the right edge of the display portion $L_{1,1}$ by $2k_H/3$. Moreover, the enlarged image $E_2$, is enlarged such that it protrudes from the left edge of the display portion $L_{2,1}$ by $k_H/3$ and protrudes from the right edge of the display portion $L_{2,1}$ by $k_H/3$. Thus, between the display portions $L_{1,1}$ and $L_{2,1}$, the enlarged images $E_{1,1}$ and $E_{2,1}$ protrude to connect to each other and become continuous. Thus, it is possible to prevent a displayed image from being distorted as shown in FIG. 11.

Although the example described above deals with the case where the example applies to the multiple image display device 1 that is provided with a total of nine image display devices D, three in a horizontal direction and three in a vertical direction, this Example is not limited to this example. For example, this Example can be suitably applied to the case of two. In this case, the length of each of the parts of two enlarged images that protrude between adjacent two display portions L is $k_H/2$.

An enlargement factor $w_V$ in the vertical direction can be set in the same manner as the enlargement factor $w_{2H}$ in the horizontal direction. With respect to the enlargement factor $w_V$ in the vertical direction, since it is sufficient to understand it by replacing what are described above based on the horizontal direction with those based on the vertical direction, its detailed description will be omitted.

Even when the multiple display mode is kept on in FIG. 6, if the number of horizontal sets and the number of vertical sets are each set at one, the normal display in step 2 may be performed.

The size of the division image when displayed may be equal to that of the display portion L. In particular, the length of the displayed input image in the horizontal direction (vertical direction) may be equal to the sum of the lengths of the display portions L in the horizontal direction (vertical direction). In this case, the denominator of equation (1) will be equal to "the sum of the lengths of the display portions L in the horizontal direction." In this case, for example, in the horizontal direction, $(w_H-1)\times$(the length of the display portion L in the horizontal direction) indicates the length of the part of the enlarged image E that protrudes from the display portion L in the horizontal direction. In other words, it is the length of the image that is not displayed because of the bezel portion.

Although, in steps 4, 6, 9 and 11 in the flowchart shown in FIG. 5, the edge portions of the division images are fixed to the edge portions of the display portions L disposed in the edge portions (the left edge, right edge, upper edge and lower edge) of the multiple image display device 1, it is not necessary to perform such fixation. For example, instead of fixing the edge portions of the division images to the edge portions of the display portions L, it is alternatively possible to generate enlarged images by significantly enlarging the division images toward edge portions opposite from the edge portions of the display portion L.

SECOND EXAMPLE

The second Example will now be described. In the second Example, the enlargement factor for the enlarged image E described in the first Example is further strictly controlled. Before the second Example is described, a problem on the first Example will be described with reference to the accompanying drawings.

Figure 8:
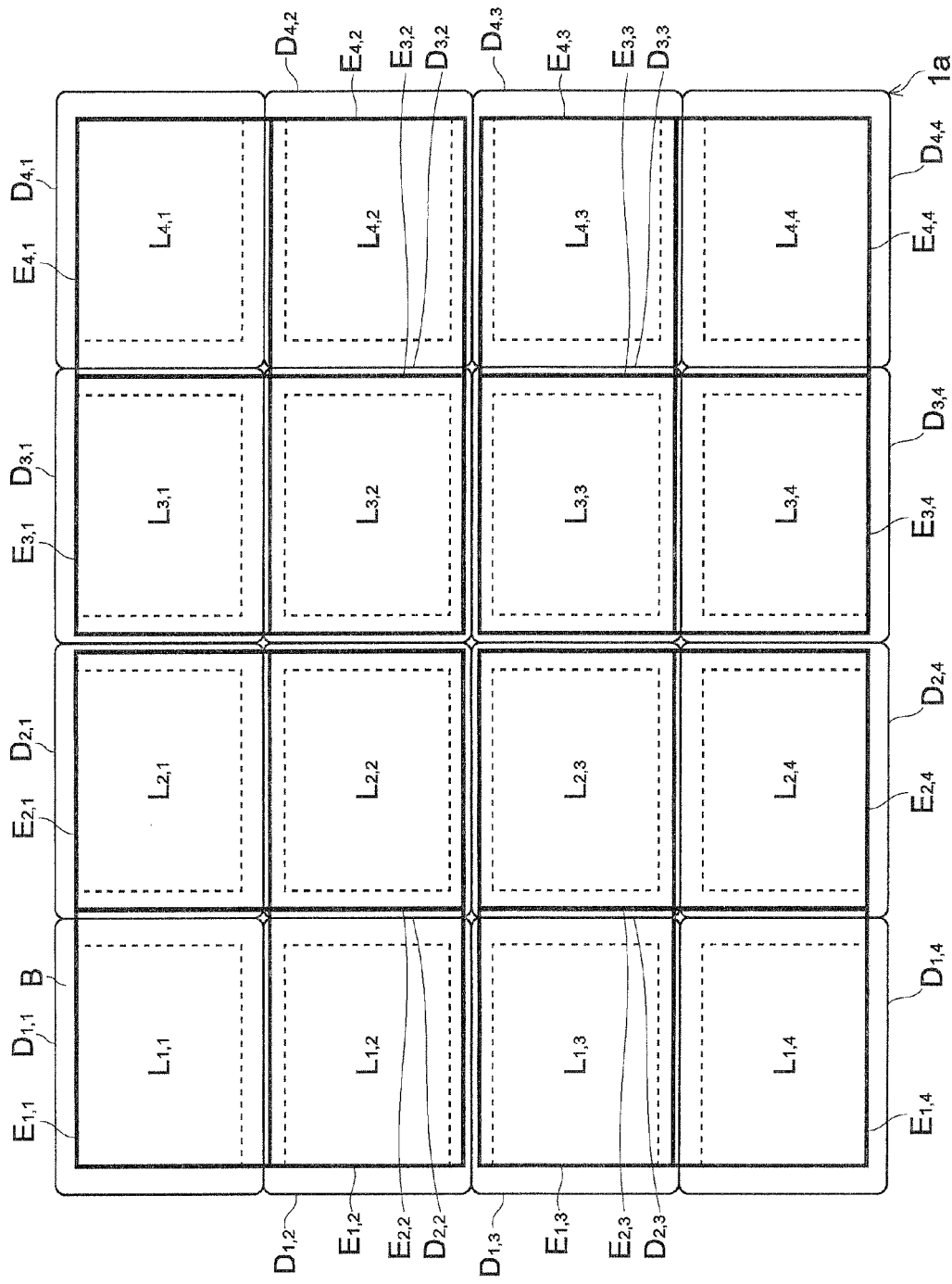
FIG. 8 is a schematic diagram showing enlarged images displayed on the multiple image display device.

As with FIG. 7, FIG. 8 is a schematic diagram in which enlarged images are displayed on a multiple image display device. The multiple image display device 1a shown in FIG. 8 is composed of a total of 16 image display devices D, four in a horizontal direction and four in a vertical direction. As to how to give symbols and illustrate drawings, the same methods as those shown in FIG. 7 are used.

The image processing portion P shown in the first Example only specifies that, in the display portion L of the image display device D disposed in the edge portion of the multiple image display device 1, the enlarged image E is generated by enlarging the division image to be displayed toward an edge portion opposite from the edge portion. Thus, in portions other than the edge portion, there is no limitation as to how the enlarged image E is enlarged (protruded) from the display portion L. For example, most simply, the enlarged image E may be protruded evenly. However, if the enlarged image E is evenly protruded from the display portion L, a problem shown in FIG. 8 can be produced.

Specifically, for example, between the enlarged images $E_{2,1}$ and $E_{3,1}$, their sides do not coincide with each other and the enlarged images partially become noncontinuous. When the overall enlargement factor is increased to prevent them from being noncontinuous, the enlarged images E overlaps each other. Thus, the image is distorted as shown in FIG. 11. Here, when only the enlarged images $E_{2,1}$ and $E_{3,1}$ shown in FIG. 8 are further enlarged in the horizontal direction, it is possible to make the enlarged images become continuous. However, since the enlargement factor is different for each of the enlarged images E, the image is distorted.

The image processing portion P of the second Example overcomes the problem described above. Specifically, the same enlargement factor is used for all the enlarged images E and the lengths of the parts of the enlarged images E that protrude from the display portions L are controlled, with the result that an image without distortion is displayed.

Figure 9:
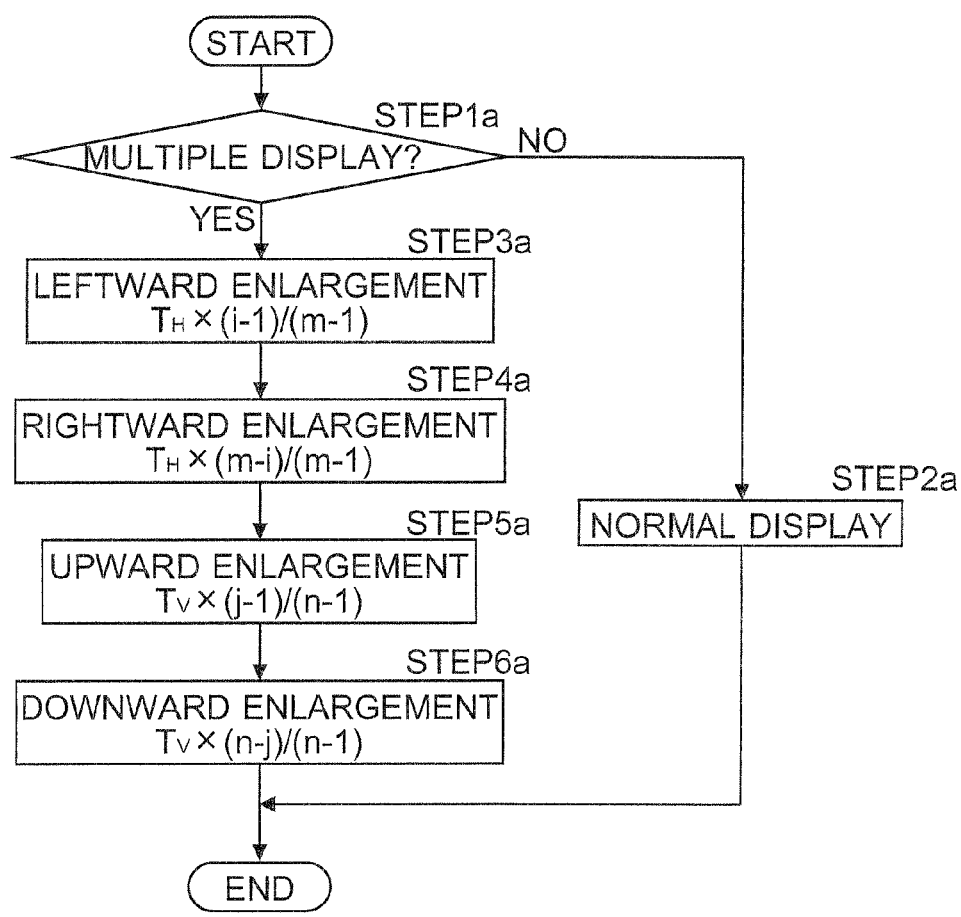
FIG. 9 is a flowchart for determining a processing method performed in the image processing portion of a second Example.

The second Example will be described with reference to the accompanying drawings. FIG. 9 is a flowchart for determining a processing method performed in the image processing portion of the second Example, and corresponds to FIG. 5 showing the first Example. As in FIG. 5, the flowchart shown in FIG. 9 relates to processing performed in the image processing portions P, and the processing methods performed in the image processing portions P can be set on an individual basis. The setting screen shown in FIG. 6 can also be applied to this Example.

As shown in FIG. 9, the image processing portion P first checks whether or not it is set to perform a multiple display (step 1a). For example, if, in the example shown in FIG. 6, the multiple display mode is set on, the multiple display mode is performed. Here, if the image processing portion P is set not to perform the multiple display (step 1a, no), a normal display is determined to be performed and this process is completed (step 2a).

The normal display, for example, refers to display that is performed by only one of the image display devices or display that is performed independently by each of a plurality of image display devices. Even when display is performed by one of the image display devices, the generation of the division image by the image acquisition portion PA, the generation of the enlarged image by the image enlargement portion PB and the generation of the output image by the image adjustment portion PC may be performed. Specifically, in the example shown in FIG. 6, when values for horizontal bezel adjustment and vertical bezel adjustment showing the enlargement factor are larger than zero, the enlargement may be performed. Moreover, in this case, the image may be enlarged in the four directions.

On the other hand, if the image processing portion P is set to perform the multiple display (step 1a, yes), the enlargement method performed by the image enlargement portion PB is determined. In the example shown in FIG. 9, an enlargement method in the horizontal direction is first set. In this Example, in particular, based on the horizontal position number "i" and the vertical position number "j" and the number "m" of image display devices provided in the horizontal direction and the number "n" of image display devices provided in the vertical direction, the enlargement method performed in the image enlargement portion PB is determined.

An enlargement factor $G_L$ in the left direction is first set as shown in equation (2) below (step 3a). $T_H$ in equation (2) is an enlargement factor for the division image in the horizontal direction and is based on the length of the display portion L. Specifically, $T_H$ is an enlargement factor by which a division image whose horizontal length is made equal to the horizontal length of the display portion L is multiplied. Hence, the enlarged image E protrudes from the display portion L by $(T_H-1) \times$ (the length of the display portion L in the horizontal direction).

$$G_L = T_H \times (i-1)/(m-1) \qquad (2)$$

Then, an enlargement factor $G_R$ in the right direction is set as shown in equation (3) below (step 4a).

$$G_R = T_H \times (m-i)/(m-1) \qquad (3)$$

Then, an enlargement factor $G_U$ in the upward direction is set as shown in equation (4) below (step 5a). $T_V$ in equation (4) is an enlargement factor for the division image in the vertical direction and is based on the length of the display portion L. Specifically, $T_V$ is an enlargement factor by which a division image whose vertical length is made equal to the vertical length of the display portion L is multiplied. Hence, the enlarged image E protrudes from the display portion L by $(T_V-1) \times$ (the length of the display portion L in the vertical direction).

$$G_U = T_V \times (j-1)/(n-1) \qquad (4)$$

Then, an enlargement factor $G_D$ in the downward direction is set as shown in equation (5) below (step 6a).

$$G_D = T_V \times (n-j)/(n-1) \qquad (5)$$

The processing method performed in the image processing portion P is determined in this way, and the process is completed. $T_H$ and $T_V$ in equations (2) to (5) above are determined by, for example, values for horizontal bezel adjustment, vertical bezel adjustment and the like shown in FIG. 6. As the horizontal position number "i", for example, a value for the horizontal position shown in FIG. 6 can be used. As the vertical position number "j", for example, a value for the vertical position shown in FIG. 6 can be used. As the number "m" of image display devices provided in the horizontal direction, for example, a value for the number of horizontal sets shown in FIG. 6 can be used. As the number "n" of image display devices provided in the vertical direction, for example, a value for the number of vertical sets shown in FIG. 6 can be used.

Figure 10:
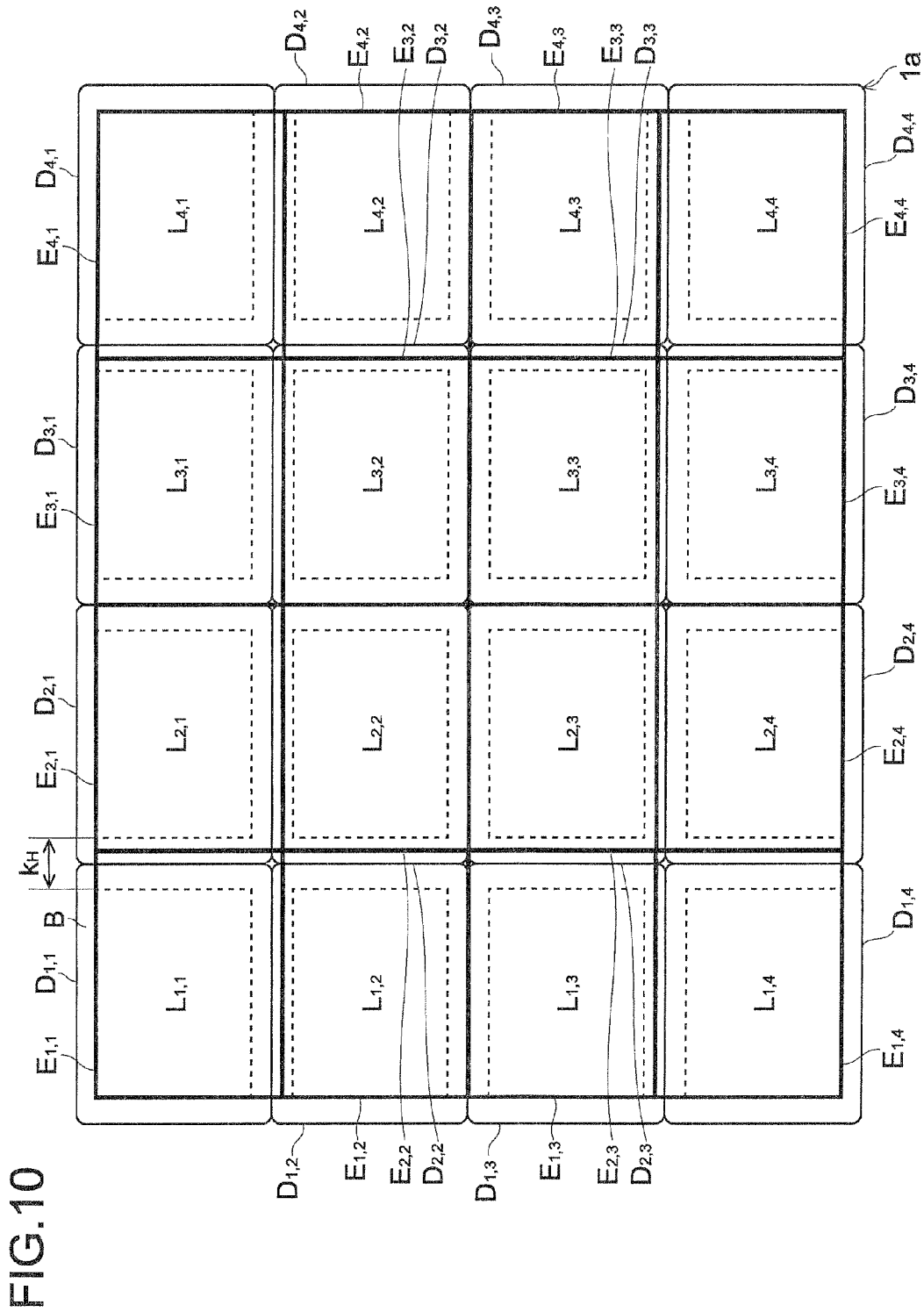
FIG. 10 is a schematic diagram showing enlarged images displayed on the multiple image display device.

An example of the enlarged image obtained by the method set as described above is shown in FIG. 10. FIG. 10 is a schematic diagram in which enlarged images are displayed on a multiple image display device. The multiple image display device shown in FIG. 10 has the same configuration as that shown in FIG. 8. Specifically, FIG. 10 shows the multiple image display device 1a composed of a total of 16 image display devices, four in a horizontal direction and four in a vertical direction. As to how to give symbols and illustrate drawings, the same methods as those shown in FIG. 8 are used.

The image display devices $D_{1,1}$ to $D_{1,4}$ provided in the left edge portion of the multiple image display device 1a will first be described. The horizontal position number "i" of these image display devices $D_{1,1}$ to $D_{1,4}$ is one. Here, the enlargement factor $G_L$ in the left direction is zero ($T_H \times (1-1)/(4-1)=0$). Specifically, the left sides of the display portions $L_{1,1}$ to $L_{1,4}$ coincide with the left sides of the enlarged images $E_{1,1}$ to $E_{1,4}$. On the other hand, the enlargement factor $G_R$ in the right direction is $T_H$ ($T_H \times (4-1)/(4-1)=T_H$). Specifically, the right sides of the enlarged images $E_{1,1}$ to $E_{1,4}$ protrude from the right sides of the display portions $L_{1,1}$ to $L_{1,4}$.

The same is true with the image display devices $D_{4,1}$ to $D_{4,4}$ provided in the right edge portion of the multiple image display device 1a. The horizontal position number "i" of these image display devices $D_{4,1}$ to $D_{4,4}$ is four. Here, the enlargement factor $G_L$ in the left direction is $T_H$ ($T_H \times (4-1)/(4-1)=T_H$), and the left sides of the enlarged images $E_{4,1}$ to $E_{4,4}$ protrude from the left sides of the display portions $L_{4,1}$ to $L_{4,4}$. On the other hand, the enlargement factor $G_R$ in the right direction is zero ($T_H \times (4-4)/(4-1)=0$). Specifically, the right sides of the display portions $L_{4,1}$ to $L_{4,4}$ coincide with the right sides of the enlarged images $E_{4,1}$ to $E_{4,4}$.

In the image display devices $D_{2,1}$ to $D_{2,4}$ and the image display devices $D_{3,1}$ to $D_{3,4}$, which are not provided in the edge portions of the multiple image display device 1a in the horizontal direction, since the horizontal position number "i" is neither one nor "m", neither the enlargement factor $G_L$ nor the enlargement factor $G_R$ is zero. Thus, the enlarged images $E_{2,1}$ to $E_{2,4}$ and the enlarged images $E_{3,1}$ to $E_{3,4}$ protrude not only from the left sides of the display portions $L_{2,1}$ to $L_{2,4}$ and the display portions $L_{3,1}$ to $L_{3,4}$ but also from the right sides thereof.

A description will be given of the lengths of the parts of the enlarged images $E_{p,j}$ and $E_{p+1,j}$ that protrude in the horizontal direction with respect to two image display devices $D_{p,j}$ and $D_{p+1,j}$ adjacent to each other in the horizontal direction ("p" represents a natural number). The enlargement factor $G_R$ for the enlarged image $E_{p,j}$ in the right direction is $T_H \times (m-p)/(m-1)$. On the other hand, the enlargement factor $G_L$ for the enlarged image $E_{p+1,j}$ in the left direction is $T_H \times (p+1-1)/(m-1)$. Thus, when the length of the display portion L in the horizontal direction is referred to as $L_H$, the sum Q of the lengths of the parts of the enlarged images $E_{p,j}$ and $E_{p+1,j}$ that protrude between the display portions $L_{p,j}$ and $L_{p+1,j}$ is represented by equation (6) below.

$$Q = L_H \times (T_H-1) \times m/(m-1) \qquad (6)$$

Here, the enlargement factor $T_H$ is represented with a distance $K_H$ between two display portions L adjacent to each other in the horizontal direction, and thus, as in equation (1), $T_H = \{L_H \times m + k_H \times (m-1)\}/(L_H \times m) = 1 + k_H(m-1)/(L_H \times m)$. When equation (6) is represented with this, then $Q = k_H$. Hence, the right side of the enlarged image $E_{p,j}$ and the left side of the enlarged image $E_{p+1,j}$, which protrude between the display portions $L_{p,j}$ and $L_{p+1,j}$ adjacent to each other in the horizontal direction, coincide with each other. In other words, the enlarged images $E_{p,j}$ and $E_{p+1,j}$ connect to each other.

The same is true in the vertical direction. The vertical position number "j" of the image display devices $D_{1,1}$ to $D_{4,1}$ provided in the upper edge of the multiple image display device 1a is one. Here, the enlargement factor $G_U$ in the upward direction is zero ($T_V \times (1-1)/(4-1)=0$). Specifically, the upper sides of the display portions $L_{1,1}$ to $L_{4,1}$ coincide with the upper sides of the enlarged images $E_{1,1}$ to $E_{4,1}$. On the other hand, the enlargement factor $G_D$ in the downward direction is $T_V$ ($T_V \times (4-1)/(4-1)=T_V$). Specifically, the lower sides of the enlarged images $E_{1,1}$ to $E_{4,1}$ protrude from the lower sides of the display portions $L_{1,1}$ to $L_{1,4}$.

The vertical position number "j" of the image display devices $D_{1,4}$ to $D_{4,4}$ provided in the lower edge of the multiple image display device 1a is four. Here, the enlargement factor $G_U$ in the upward direction is $T_V (T_V \times (4-1)/(4-1)=T_V)$, and the upper sides of the enlarged images $E_{1,4}$ to $E_{4,4}$ protrude from the upper sides of the display portions $L_{1,4}$ to $L_{4,4}$. On the other hand, the enlargement factor $G_D$ in the downward direction is zero ($T_V \times (4-4)/(4-1)=0$). Specifically, the lower sides of the display portions $L_{1,4}$ to $L_{4,4}$ coincide with the lower sides of the enlarged images $E_{1,4}$ to $E_{4,4}$.

In the image display devices $D_{1,2}$ to $D_{4,2}$ and the image display devices $D_{1,3}$ to $D_{4,3}$, which are not provided in the edge portions of the multiple image display device $1a$ in the vertical direction, since the vertical position number "j" is neither one nor "n", neither the enlargement factor $G_U$ nor the enlargement factor $G_D$ is zero. Thus, the enlarged images $E_{1,2}$ to $E_{4,2}$ and the enlarged images $E_{1,3}$ to $E_{4,3}$ protrude not only from the upper sides of the display portions $L_{1,2}$ to $L_{4,2}$ and the display portions $L_{1,3}$ to $L_{4,3}$ but also from the lower sides thereof.

A description will be given of the lengths of the parts of the enlarged images $E_{i,r}$ and $E_{i,r+1}$ that protrude in the vertical direction with respect to two image display devices $D_{i,r}$ and $D_{i,r+1}$ adjacent to each other in the vertical direction ("r" represents a natural number). The enlargement factor $G_D$ for the enlarged image $E_{i,r}$ in the downward direction is $T_V \times (r-1)/(n-1)$. On the other hand, the enlargement factor $G_U$ for the enlarged image $E_{i,r+1}$ in the upward direction is $T_H \times (r+1-1)/(n-1)$. Thus, when the length of the display portion L in the vertical direction is referred to as $L_V$, the sum S of the lengths of the parts of the enlarged images $E_{i,r}$ and $E_{i,r+1}$ that protrude between the display portions $L_{i,r}$ and $L_{i,r+1}$ is represented by equation (7) below.

$$S = L_V \times (T_V - 1) \times n/(n-1) \quad (7)$$

Here, the enlargement factor $T_V$ is represented with a distance $k_V$ between two display portions L adjacent to each other in the vertical direction, and thus, as in equation (1), $T_V = \{L_V \times n + k_V \times (n-1)\}/(L_V \times n) = 1 + k_V \times (n-1)/(L_V \times n)$. When equation (7) is represented with this, then $S = k_V$. Hence, the lower side of the enlarged image $E_{i,r}$ and the upper side of the enlarged image $E_{i,r+1}$, which protrude between the display portions $L_{i,r}$ and $L_{i,r+1}$ adjacent to each other in the vertical direction, coincide with each other. In other words, they connect to each other.

When the multiple image display device $1a$ is configured as described above, as in the first Example, in the edge portions of the multiple image display device $1a$, the sides of the enlarged images E coincide with the sides of the display portions L. Thus, when an output image based on the enlarged images E is displayed, the edge portions of the image are displayed. This makes it possible to display an easily recognizable image. Furthermore, it is easier for the user to find a GUI, with the result that the operability can be prevented from being degraded.

In this Example, the enlargement factors $T_H$ and $T_V$ for the individual enlarged images E are equal to each other, and the sides of the enlarged images E can be reliably aligned to connect to each other. Thus, it is possible to make the enlarged images E as a whole become continuous. This makes it possible to prevent a displayed image from being distorted as shown in FIG. 11. Even when the multiple display mode is kept on in FIG. 6, if the number of horizontal sets and the number of vertical sets are each set at one, the normal display in step $2a$ may be performed.

The size of the division image may be equal to that of the display portion L. In particular, the length of the input image in the horizontal direction (vertical direction) may be equal to the sum of the lengths of the display portions L in the horizontal direction (vertical direction).

Although the example described above deals with the case where the example applies to the multiple image display device $1a$ that is provided with a total of 16 image display devices D, four in a horizontal direction and four in a vertical direction, this Example is not limited to this example. Even if the number of image display devices D incorporated in the multiple image display device $1a$ is increased or decreased, this Example can applies to such a case without problem.

<<Modified Examples>>

In the multiple image display device 1 of the embodiment of the present invention, the operation of the image processing portion P may be performed by a control device such as a personal computer. Furthermore, the whole or part of the function achieved by such a control device is realized by a program, and the program is executed on a program execution device (for example, a computer), with the result that the whole or the part of the function may be achieved.

In addition to the above-described case, the multiple image display device 1 shown in FIG. 2 and the image processing portion P shown in FIG. 3 can be provided by hardware or combination of hardware and software. When the multiple image display device 1 and the image processing portion P are provided by software, a block diagram for portions that are provided by software represents a functional block diagram for those portions.

Although the embodiment of the invention is described above, the scope of the invention is not limited to this embodiment, and many modifications are possible without departing from the spirit of the invention.

The present invention relates to a multiple image display device that has a plurality of image display devices and that displays a single image. The invention also relates to image display devices that constitute a multiple image display device.

What is claimed is:

1. A multiple image display device array comprising:
an array of display devices arrayed in horizontal and vertical direction, each display device having a housing portion surrounding a display portion;
a division portion dividing a single input image into division images that are displayed on the array of display devices; and
an enlargement portion enlarging the division images obtained in the division portion, wherein,
the division images are enlarged horizontally based on a horizontal enlargement factor TH, and enlarged vertically based on a vertical enlargement factor, Tv, where $TH=1+l \sim \times (m-1)/(LH \times m)$ and $Tv=1+Kv \times (n-1)/(Lv \times n)$, the enlargement portion enlarges each division image so that the division image protrudes from the display portion toward the one end and the other end by the ratio of $(i-1)/(m-1)$ to $(m-i)/(m-1)$ in the horizontal direction and $(j-1)/(n-1)$ to $(n-j)/(n-1)$ in the vertical direction, wherein
"KH" equals a distance between the right side of the display portion of a first display device and the left side edge of the display portion of a second display device positioned on the right side neighbor of the first display device in the display device array,
"Kv" equals a distance between the lower side edge of the display portion of a first display device and the upper side edge of the display portion of a third display device positioned on the lower side neighbor of the first display device in the display device array,
"LH" equals the length of the horizontal side edge of the display portion,
"Lv" equals the length of the vertical side edge of the display portion,
"m" represents a number of image display devices provided in the horizontal direction, "n" represents a number of image display devices provided in the vertical direction
"i" represents a horizontal position of each image display device, and
"i" represents a vertical position of each image display device.

* * * * *

UNITED STATES PATENT AND TRADEMARK OFFICE
CERTIFICATE OF CORRECTION

PATENT NO. : 8,400,370 B2  
APPLICATION NO. : 12/537325  
DATED : March 19, 2013  
INVENTOR(S) : Tomonori Yoshida et al.

Page 1 of 1

It is certified that error appears in the above-identified patent and that said Letters Patent is hereby corrected as shown below:

Title page of patent, item 73 Assignees:

SANYO Electric CO., Ltd.  
Osaka, Japan should read

SANYO TECHNOLOGY CENTER (SHENZHEN) CO., LTD.  
SHENZHEN, CHINA

Signed and Sealed this  
Twenty-eighth Day of January, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,400,370 B2  
APPLICATION NO. : 12/537325  
DATED : March 19, 2013  
INVENTOR(S) : Tomonori Yoshida et al.

Page 1 of 1

It is certified that error appears in the above-identified patent and that said Letters Patent is hereby corrected as shown below:

Title page of patent, item 73 Assignees, should read:

SANYO Electric CO., Ltd.  
Osaka, Japan

SANYO TECHNOLOGY CENTER (SHENZHEN) CO., LTD.  
SHENZHEN, CHINA

This certificate supersedes the Certificate of Correction issued January 28, 2014.

Signed and Sealed this  
Ninth Day of June, 2015

Michelle K. Lee  
*Director of the United States Patent and Trademark Office*